J. S. STUKEY.
Wheel Cultivator.
No. 52,462. Patented Feb. 6, 1866.
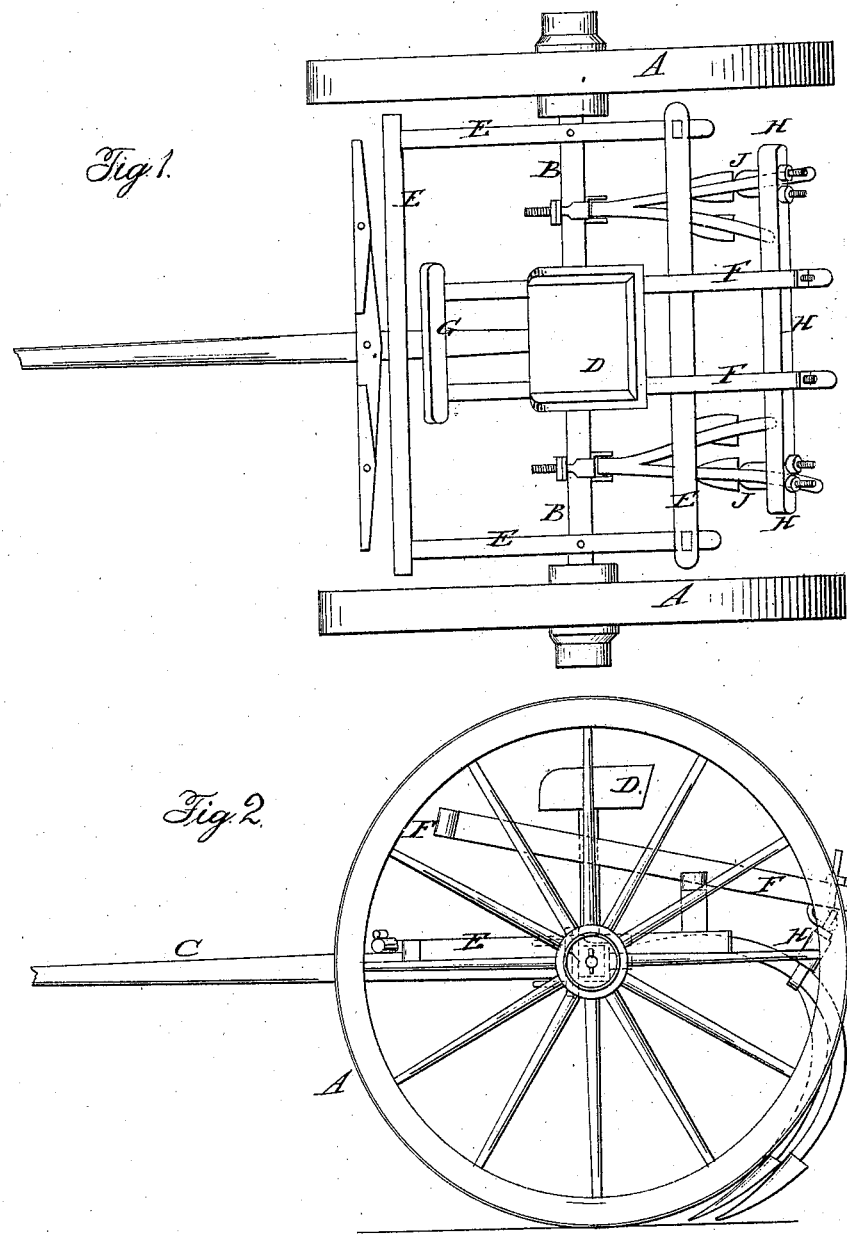

UNITED STATES PATENT OFFICE.

JOSEPH S. STUKEY, OF SUGAR GROVE, OHIO.

IMPROVEMENT IN CORN-CULTIVATORS.

Specification forming part of Letters Patent No. 52,462, dated February 6, 1866.

*To all whom it may concern:*

Be it known that I, JOSEPH S. STUKEY, of Sugar Grove, Fairfield county, State of Ohio, have invented new and useful Improvements in Corn-Cultivators; and I do hereby declare the following to be an exact description thereof, reference being had to the accompanying drawings, and to the letters of reference marked thereon, making a part of this specification.

The nature of my invention consists in the construction of the double shovel adjustable on the carriage-axle, in combination with the cross-bar and foot-lever for raising or lowering the shovels.

Figure 1 represents a top view of the machine; Fig. 2, a side elevation.

A represents the carriage-wheels; B, the axle; C, the tongue and double-trees for two horses; D, the driver's seat; E, a square frame attached to the tongue and to the axle by bolts.

On the back part of the frame E is a double lever, F, (to be operated by the driver's feet pressing on the cross-piece G,) that operates on the frame E, and is connected by links to cross-bar H, that is attached to the round drag-bar or curved cultivator J. Thus when the driver's feet are pressed upon the cross-piece G the teeth J are raised or lowered.

The shovels or teeth are double, one set before the other, so that the furrow made by the inside tooth (as the ground is thrown to the center) is immediately filled by the earth thrown from the outside tooth or shovel. These teeth J are adjustable on the axle of the carriage by clips and screw-bolts, so as to narrow and widen between the furrows when required.

What I claim as my invention, and desire to secure by Letters Patent, is—

The combination and arrangement of the plows or cultivators, cross-bar, axle, and frame, when made adjustable, as and for the purposes set forth.

JOSEPH S. STUKEY.

Witnesses:
    J. FRANLIN REIGART,
    EDM. F. BROWN.